US012507816B1

(12) United States Patent
Essink

(10) Patent No.: US 12,507,816 B1
(45) Date of Patent: Dec. 30, 2025

(54) PEG MOUNTED LIGHTING SUPPORT

(71) Applicant: Lighting for Impact, LLC, Lincoln, NE (US)

(72) Inventor: Chad C Essink, Lincoln, NE (US)

(73) Assignee: Lighting for Impact, LLC, Lincoln, NE (US)

( * ) Notice: Subject to any disclaimer, the term of this patent is extended or adjusted under 35 U.S.C. 154(b) by 0 days.

(21) Appl. No.: 19/067,236

(22) Filed: Feb. 28, 2025

Related U.S. Application Data

(60) Provisional application No. 63/685,559, filed on Aug. 21, 2024.

(51) Int. Cl.

| | |
|---|---|
| ***A47F 11/10*** | (2006.01) |
| ***F21S 4/28*** | (2016.01) |
| ***F21V 19/00*** | (2006.01) |
| ***F21V 21/088*** | (2006.01) |
| ***F21V 21/096*** | (2006.01) |

(52) U.S. Cl.
CPC ................. *A47F 11/10* (2013.01); *F21S 4/28* (2016.01); *F21V 19/004* (2013.01); *F21V 21/088* (2013.01); *F21V 21/096* (2013.01)

(58) Field of Classification Search
CPC ..... A47F 11/10; F21S 4/20; F21S 4/22; F21S 4/24; F21S 4/26; F21S 4/28; F21V 19/004; F21V 21/088; F21V 21/0885; F21V 21/096; F21V 21/0965
See application file for complete search history.

(56) References Cited

U.S. PATENT DOCUMENTS 7,909,183 B2 * 3/2011 Oh ........................ A47F 5/0823 362/132
10,405,678 B1 * 9/2019 DeSena ................. A47F 5/0869

* cited by examiner

*Primary Examiner* — Sean P Gramling
(74) *Attorney, Agent, or Firm* — Dobbin IP Law, P.C.; Geoffrey E. Dobbin

(57) ABSTRACT

A peg mounted light support may feature a magnetic component to allow securement to ferrous merchandiser peg bodies. A strip passageway is defined by two opposed legs while feet on these legs turn inward to allow the support body to slide along a length of the strip as needed to interact with merchandiser pegs. A second channel is defined by two opposed lower walls to accommodate the merchandiser peg.

2 Claims, 8 Drawing Sheets

PEG MOUNTED LIGHTING SUPPORT

CROSS-REFERENCES TO RELATED APPLICATIONS

The present invention claims the benefit of priority to prior filed U.S. Application No. 63/685,559, filed on Aug. 21, 2024, and incorporates the same by reference herein in its entirety.

FIELD OF THE INVENTION

The present invention relates to the field of merchandising and more particularly relates to a mount for light strips which will support said light strips on the pegs of a merchandiser.

BACKGROUND OF THE INVENTION

The process of buying and selling is a cornerstone of a capitalistic society. It is also well known that the presentation of goods sold can affect not only a customer's opinion of the goods, but also can provide more information to a potential customer before purchase. To this end, merchandizers are manufactured to hold and display goods offered for sale. While some merchandisers may be specifically designed for a given product, a common merchandiser is a simple peg board with a plurality of pegs that may be positioned wherever a merchant desired in order to support hanging merchandise. The pegs may then be used to provide support and organization for many diverse types of goods and provide an orderly presentation of the goods for sale.

Improvements can be made to merchandisers, including peg boards. One of the more effective improvements is the addition of lighting. Lighting allows the product to be better seen, particularly as higher mounted product tends to cast shadows on lower ones. However, positioning lighting in a manner to illuminate product over the length of a merchandiser can be problematic, especially since the peg board is designed to be a versatile mounting solution. To this end, lighting solutions for a peg board must also be versatile.

The present invention is a magnetically secured support for LED light strips which may be transversally located along a light strip such that the support will rest upon and be secured to a merchandiser support peg through magnetic attraction. A plurality of such supports will then be used to securely hold a light strip in place until a reconfiguration of the merchandiser is desired.

The present invention represents a departure from the prior art in that the light support of the present invention allows for customization of the location of the supports on the light strip. Such customization then allows for merchandiser pegs to be positioned in any straight line arrangement and the LED light strip will be secured to said pegs.

SUMMARY OF THE INVENTION

In view of the foregoing disadvantages inherent in the known types of lighting supports, an improved peg mounted light support may provide a support that meets the following objectives: that it be adaptable to different spaces between merchandiser pegs, that it be simple to effectuate such alteration, that it be secured to the merchandiser pegs in an easily releasable manner, but only when intended to be so released, that it be inexpensive to manufacture and replace. As such, in order to accomplish these objectives, a new and improved peg mounted light support may comprise a polymer body with a defined peg channel and a light strip passageway so as to allow the supports to slide along a length of a light strip and interface with merchandiser pegs in their intended positions. Magnetic components then hold the light supports (and the strip) in position over the merchandiser pegs until such time as the merchandiser need reconfigured.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical embodiments of the invention and are therefore not to be considered as limiting of its scope, the invention will be described and explained with additional specificity and detail using the accompanying drawings. Reference numbers used herein refer to the same elements throughout the drawings.

The following reference numbers are used in this Specification and are used to consistently label the same component in all figures:

10—merchandiser LED lighting strip;
15—Merchandiser light strip power cord;
20—LEDs;
30—merchandiser;
40—merchandiser support pegs;
100—lighting support;
110—lighting support body;
112—bottom walls;
114—peg channel;
116—magnet slot;
118—securement legs;
120—securement feet;
122—passage void; and
124—magnet.

DESCRIPTION

With reference now to the drawings, a preferred embodiment of the peg mounted light support is herein described. It should be noted that the articles "a," "an," and "the," as used in this specification, include plural referents unless the content clearly dictates otherwise. As such, the Specification and Claims should not be deemed limited by these arbitrary terms other than when comparing these directions with each other. For purposes of this Specification and the Claims, "up" defines the side of the support 100 which contains the light strip 15 and "down" the side that rests upon the merchandiser pegs 40. "Longitudinal" is a direction along the length of light strip 15, thereby also defining "right" and "left," while "lateral" means across the width of the light strip 15, thereby also defining "forward" and "backward." These terms are to be understood as arbitrary designations so as to differentiate directions and orientations and are provided only for clarity in the description and appended claims and should not be seen as limiting except when context dictates otherwise.

Figure 1:
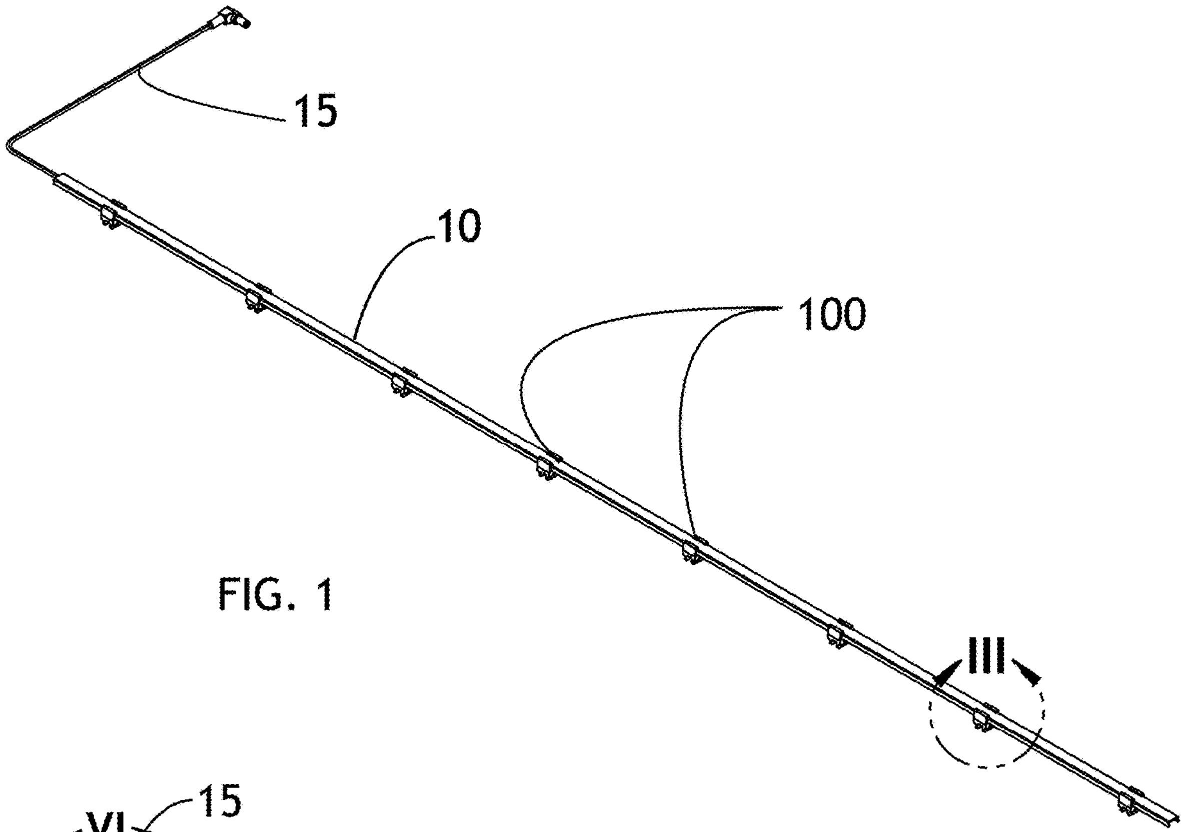
FIG. 1 is a perspective view of a light strip with a plurality of lighting supports attached thereto.
Figure 2:
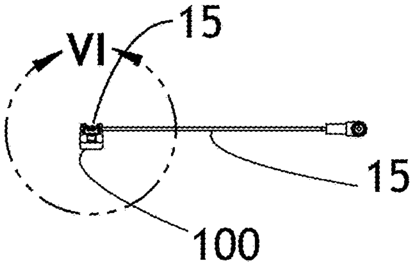
FIG. 2 is a side elevation of the light strip and supports of FIG. 1.
Figure 3:
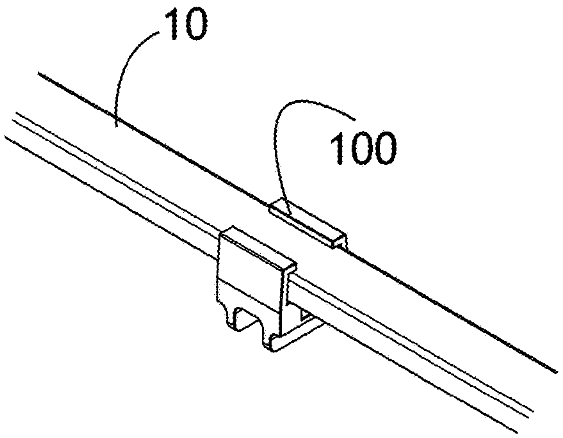
FIG. 3 is a perspective view of the lighting support mounted upon the light strip of FIG. 1, taken in circle III.
Figure 4:
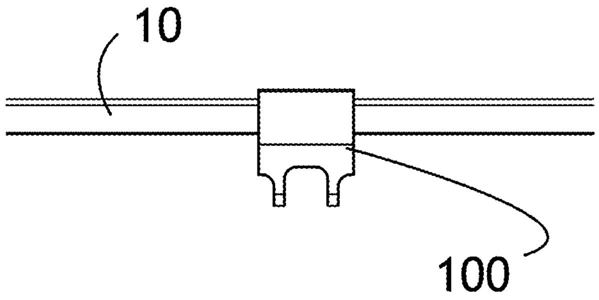
FIG. 4 is a front elevation of the lighting support of FIG. 3.
Figure 5:
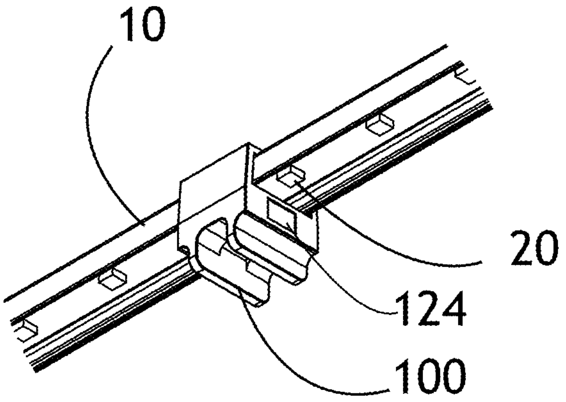
FIG. 5 is an alternate perspective view of the lighting support of FIG. 3.
Figure 6:
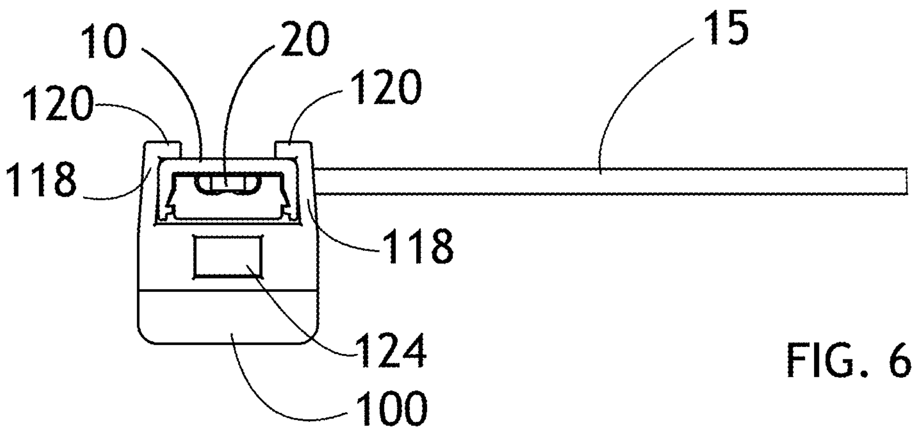
FIG. 6 is a close-up view of the lighting support and strip of FIG. 2, taken in circle VI.
Figure 7:
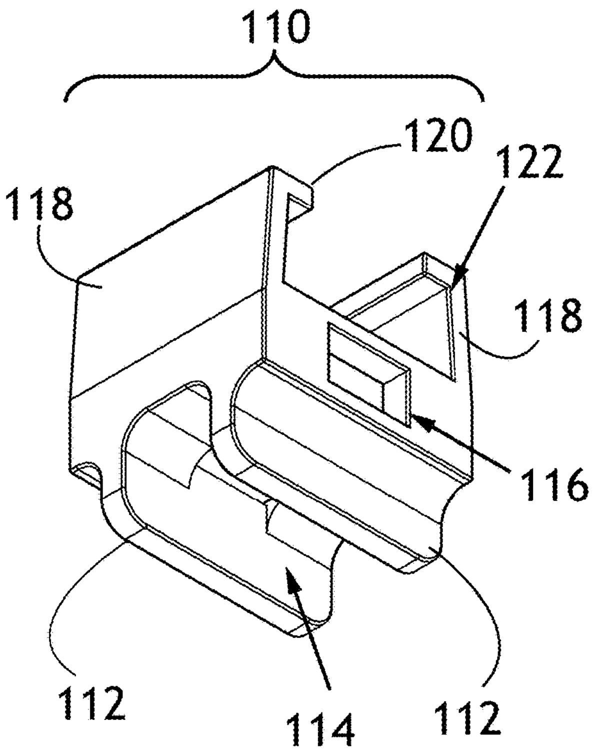
FIG. 7 is a perspective view of the lighting support housing utilized by the lighting support of FIG. 1.
Figure 8:
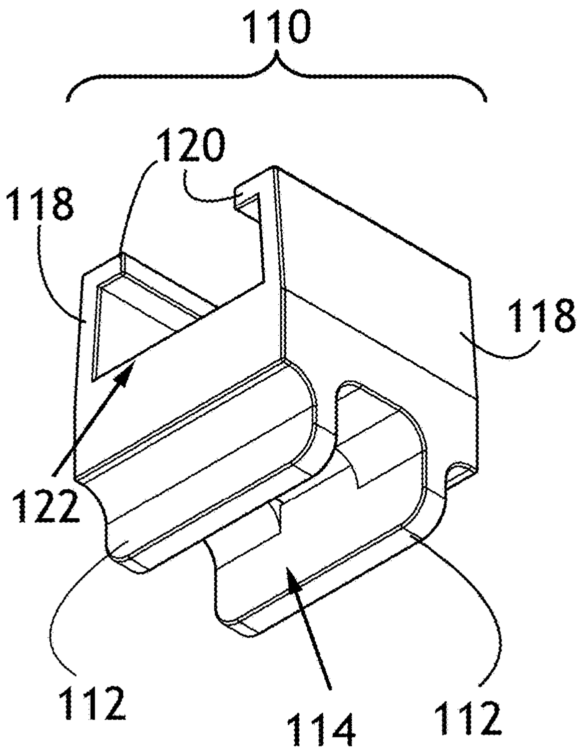
FIG. 8 is an alternate perspective view of the lighting support housing of FIG. 7.
Figure 9:
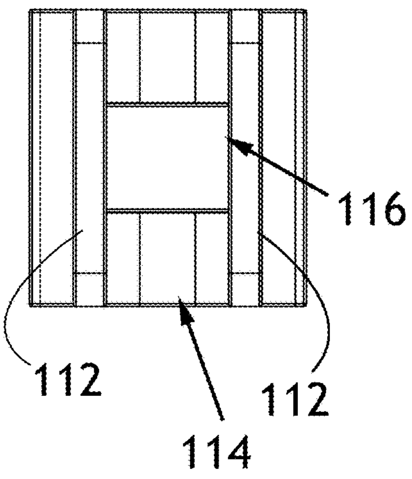
FIG. 9 is a bottom plan view of the lighting support housing of FIG. 7.
Figure 10:
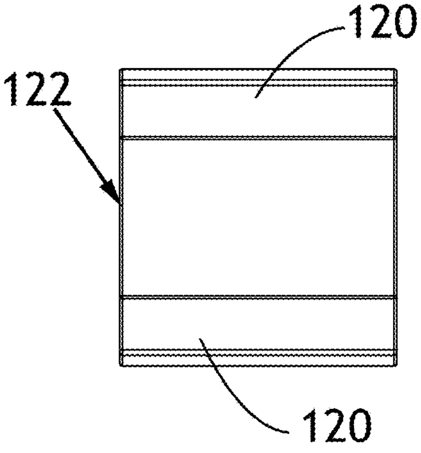
FIG. 10 is a top plan view of the lighting support housing of FIG. 7.
Figure 11:
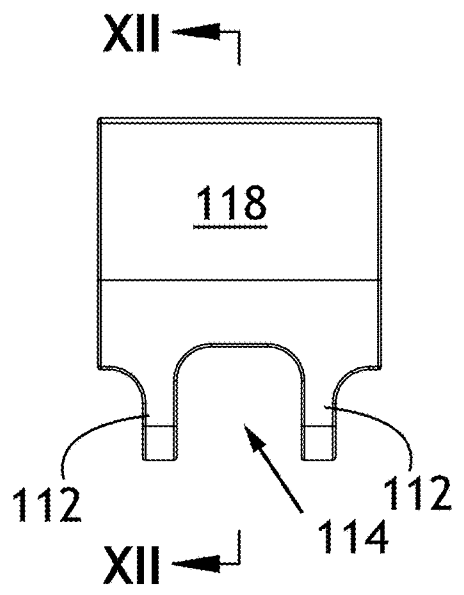
FIG. 11 is a side elevation of the lighting support of FIG. 7.
Figure 12:
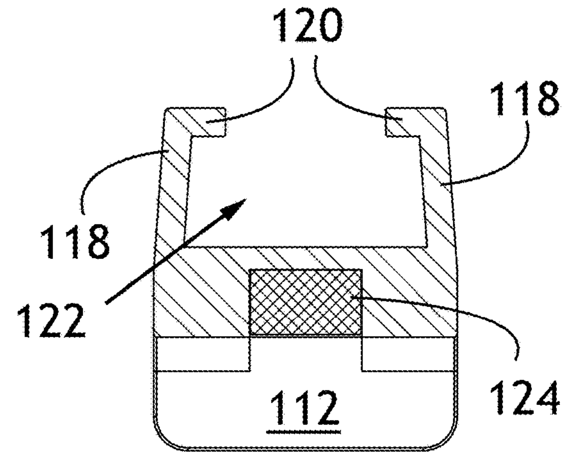
FIG. 12 a sectional view of the lighting support of FIG. 11, taken along line XII-XII.
Figure 13:
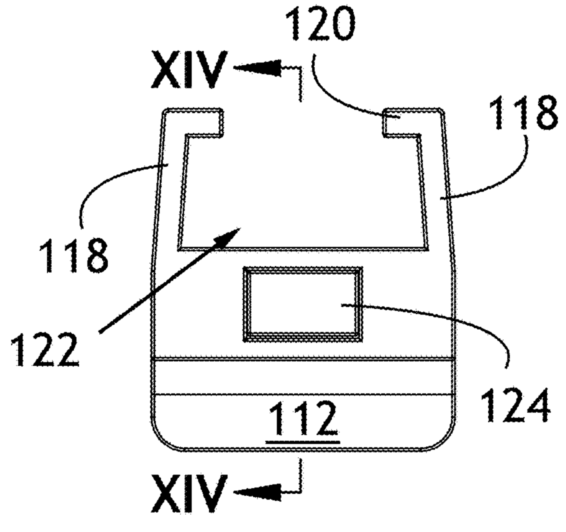
FIG. 13 is a rear elevation of the lighting support of FIG. 7.
Figure 14:
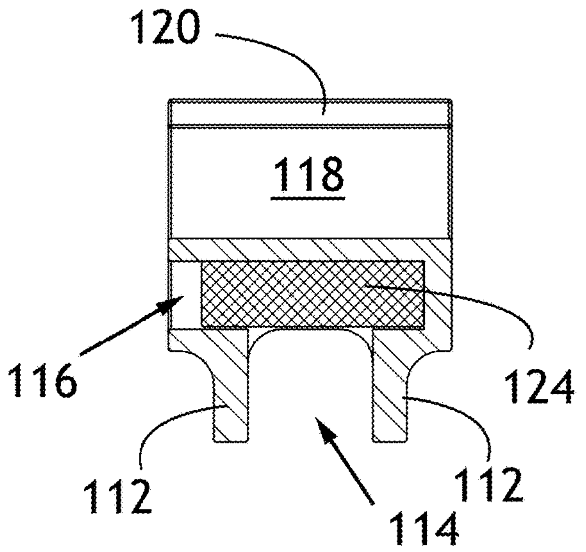
FIG. 14 is a sectional view of the lighting support of FIG. 13, taken alone line XIV-XIV.
Figure 15:
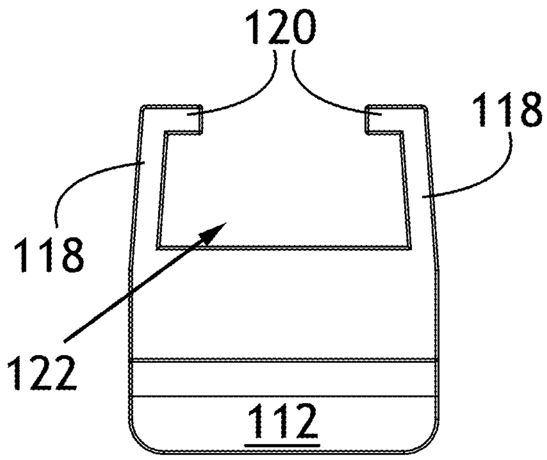
FIG. 15 is a front elevation of the lighting support of FIG. 7.

With reference to FIGS. 1 and 2, a number of peg mounted light support 100 are shown positioned about a light strip with a power cord 15. In closer views, shown in FIGS. 3-6, the individual supports 100 are shown to be slidably mounted upon each light strip 10, which forms a rail. The supports maintain enough clearance to contain the LED strip body 10 so that individual LEDS 20 do not impede the motion of the supports 100 (FIGS. 5 and 6). The main support body 110 features two upper legs 118 which hook inwards to form support feet 120 (FIGS. 7-15). These legs 118 are sufficiently removed from the body 100 to form a passageway 122 conducive to loosely containing the LED strip 10 while the feet 120 rest on an upper side of the LED strip to maintain the support's position. The legs 118 then prevent the LED strip 10 from slipping forwards or backward in relation to a merchandiser when finally installed.

A channel 114 is also provided to the individual merchandiser pegs. This is defined by to opposed channel walls 112 projecting from the bottom of the support body 110. The resultant channel 114 and the passageway 122 are orthogonal but askew to each other. A magnet slot 116 is also provided in the support body 110 between the opposed walls 112 and opposed legs 118. This slot may be in any position, but it is generally preferred to be in line with the strip passageway 122. Magnet 124 (FIGS. 12-14) resides within the slot 116 and served to securely hold the support on a merchandiser peg 20 (FIGS. 16-19). These pegs 20 tend to be ferrous and will interact well with a magnet of sufficient strength. While not shown, the magnet slot 116 can be sealed or the entire support 100 be molded over the magnet 124 in order to permanently secure the magnet within the support 100.

Figure 16:
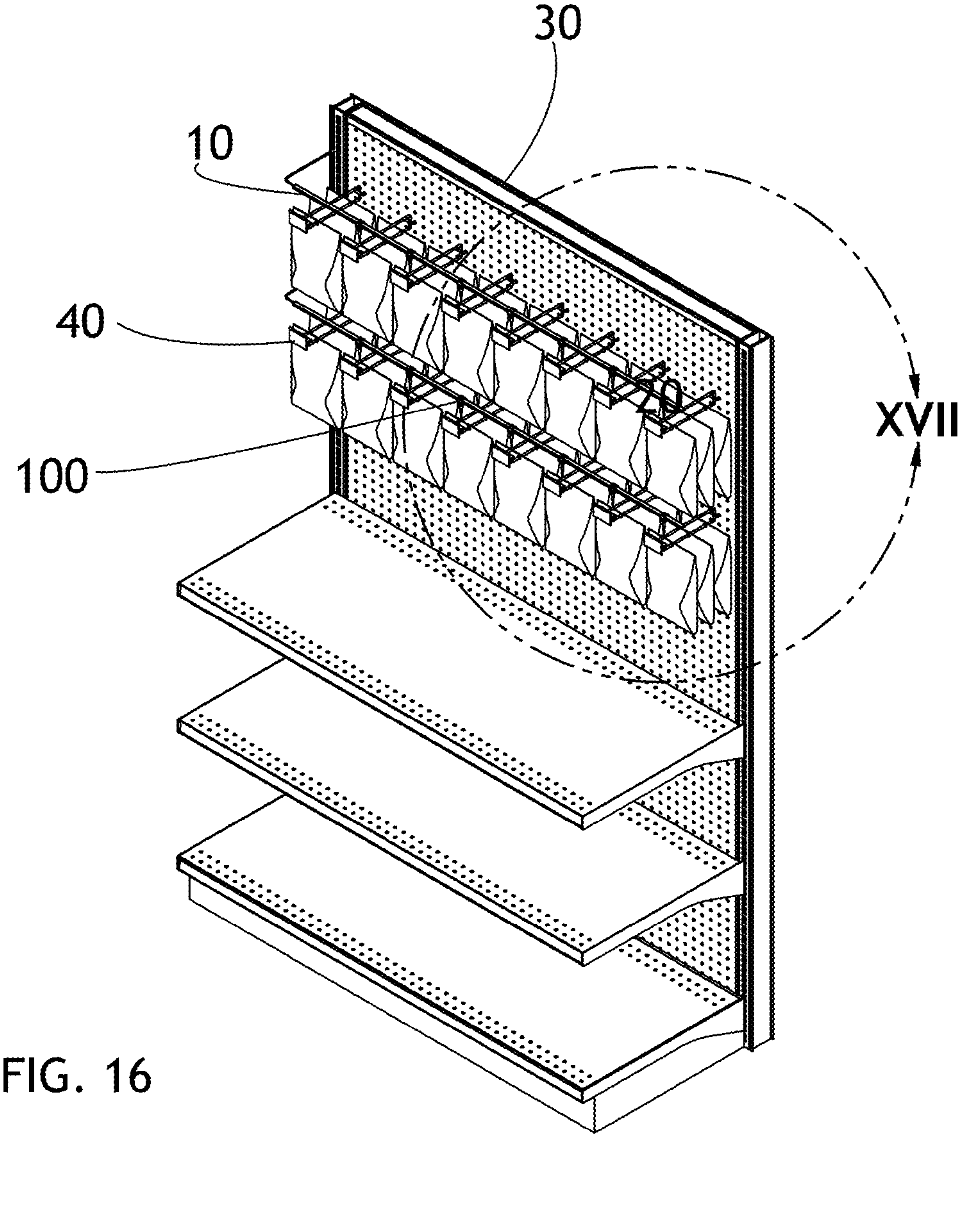
FIG. 16 is a perspective view of a merchandiser utilizing a plurality of the lighting supports of FIG. 1.
Figure 17:
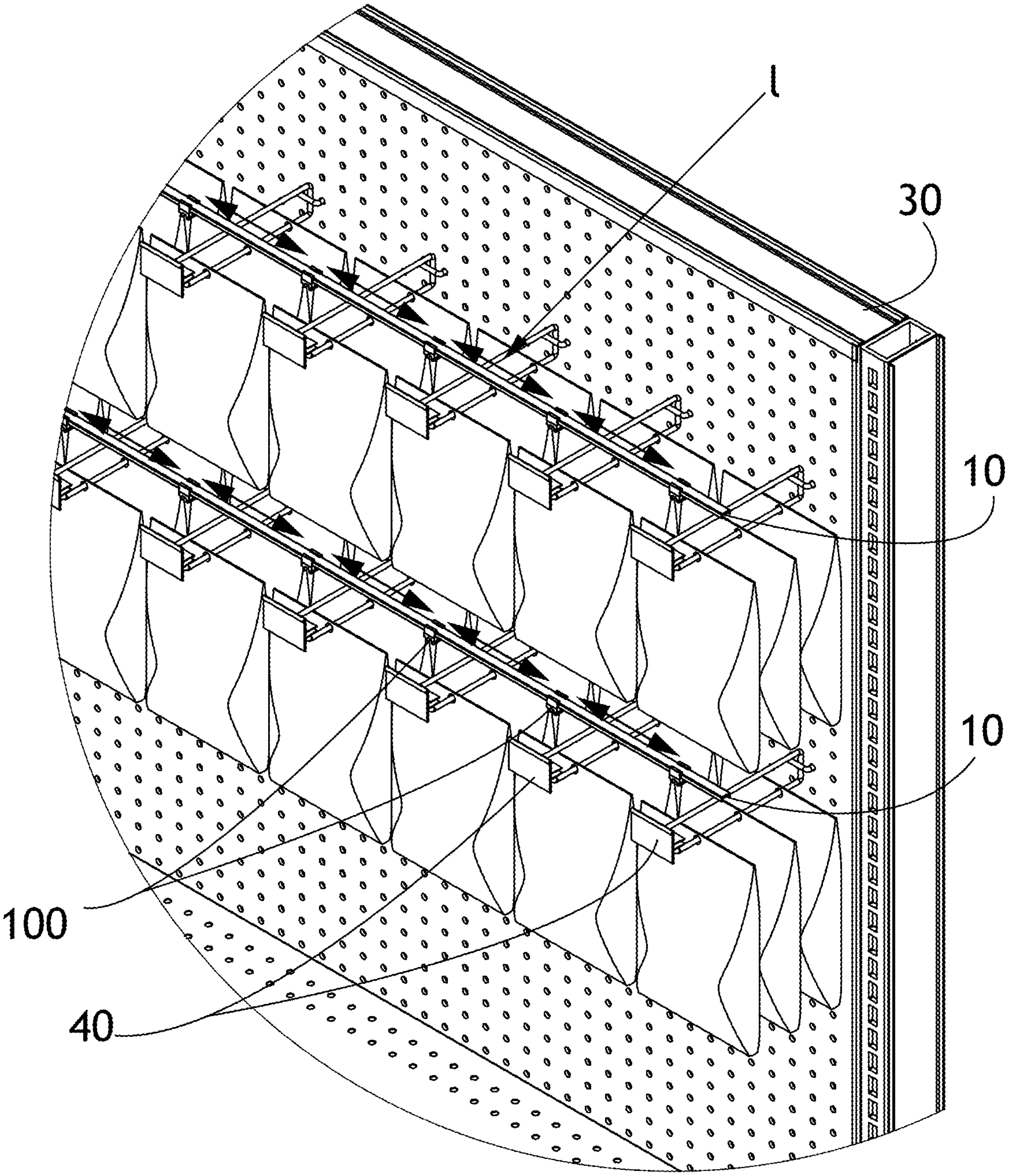
FIG. 17 is a close-up view fo the merchandiser of FIG. 16, taken in circle XVII.
Figure 18:
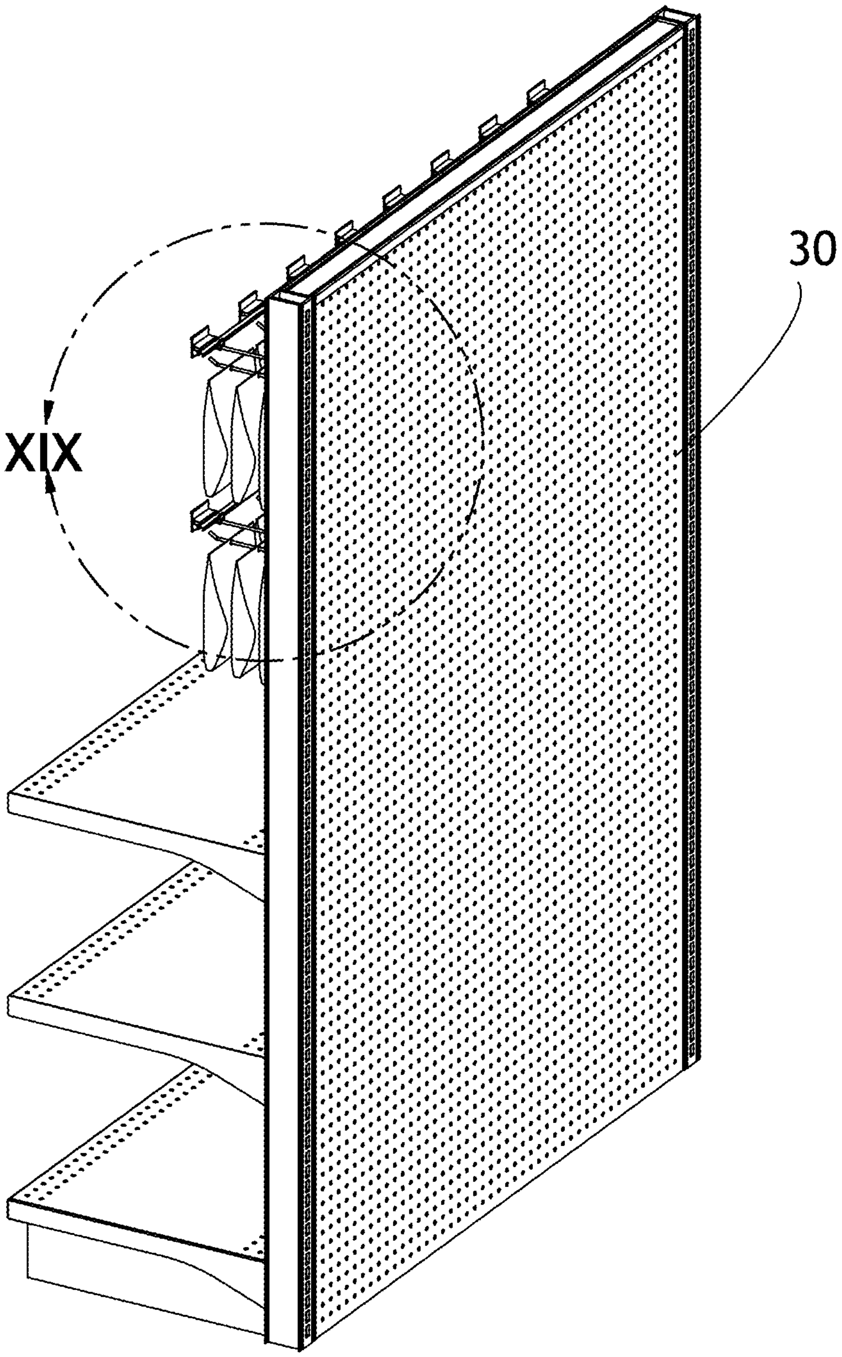
FIG. 18 is a rear perspective view of the merchandiser of FIG. 17.
Figure 19:
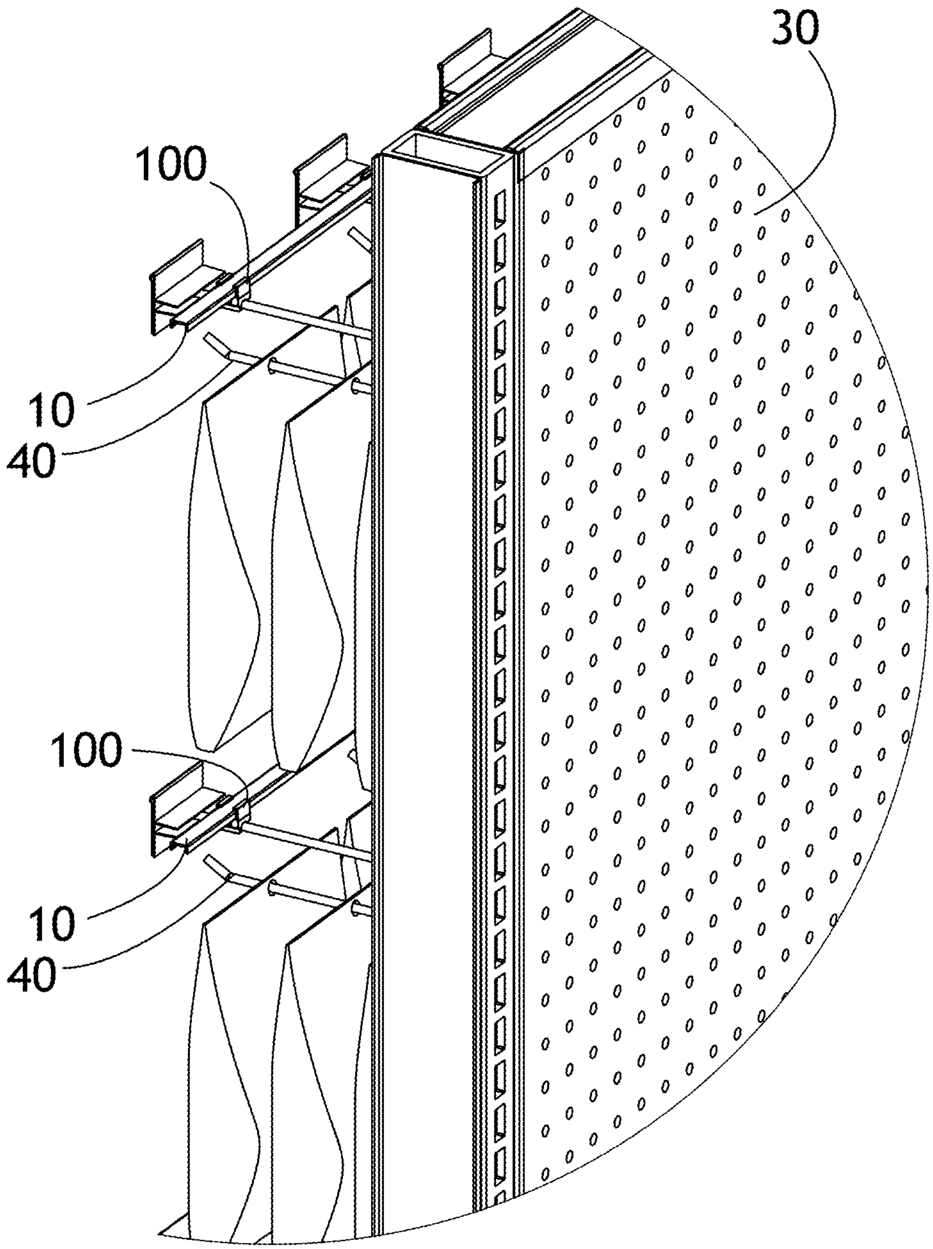
FIG. 19 is a close-up view of the merchandiser of FIG. 18, taken in circle XIX.

In use (FIGS. 16-19), a merchandiser 30 is fitted with a plurality of merchandiser pegs 40 with which to hold product. When lighting is desired, an LED strip is an easy method for providing light as they tend to be light, small in size (compared to other strips), and may be presented upon a rigid substrate. As a result, a single LED strip 10 may provide light for an entire row of similarly spaced merchandiser pegs 40. An appropriate number of light supports 100 are simply slid over the strip 100 and maneuvered into position by adjusting lengths (l) between the supports to match the merchandiser pegs 40 (FIGS. 16 and 17). The light strip 10 may then simply be put down onto the merchandiser pegs 40 (FIGS. 18 and 19) such that each support 100 rests on a peg 40. The magnetic attraction between the support 100 and peg 40 serve to secure the support 100 (and thus LED strip 10) in place until such time as the merchandiser 30 needs to be reconfigured. At which time the LED strip 10 may simply be taken off, the merchandiser pegs 40 reconfigured, the supports 100 adjusted, and the strip 10 replaced. All that is required is that merchandiser pegs 40 to be in a straight line across the merchandiser 30, though LED strips 10 can be of varied lengths and be utilized in a number of configurations.

Although the present invention has been described with reference to preferred embodiments, numerous modifications and variations can be made and still the result will come within the scope of the invention. The described embodiments are to be considered in all respects only as illustrative and not restrictive. No limitation with respect to the specific embodiments disclosed herein is intended or should be inferred. Therefore, the scope of the invention is indicated by the appended claims rather than by the foregoing description. All changes which come within the meaning and range of equivalency of the claims are to be embraced within their scope.

What is claimed is:

1. A light mounting system for a merchandiser having display pegs and at least one elongate light strip, the system comprising:

a plurality of supports, each support further comprising a main support body with:

two opposed legs, each with a foot, extending upwards therefrom, the legs defining a passageway to accommodate the light strip and defining a longitudinal direction of the main support body;

two opposed channel walls extending from a bottom of the main support body, defining a lateral channel such that the lateral channel is orthogonal and askew to the passageway; and a magnet disposed within the main body, between the legs and channel walls;

wherein the plurality of supports are positioned about the light strip and over the display pegs of the merchandiser, thereby holding the light strip in position over the display pegs through magnetic attraction between the display pegs and supports.

2. A light mounting system for a merchandiser having display pegs, the system comprising:

an elongate light strip having two opposed sides and a plurality of light sources disposed therebetween; and, a plurality of supports, each support further comprising a main support body with:

two opposed legs, each with a foot, extending upwards therefrom, the legs defining a passageway to accommodate the light strip and defining a longitudinal direction of the main support body;

two opposed channel walls extending from a bottom of the main support body, defining a lateral channel such that the lateral channel is orthogonal and askew to the passageway; and a magnet disposed within the main body, between the legs and channel walls;

wherein the plurality of supports are positioned about the light strip such that the legs encompass the walls of the light strip and over the display pegs of the merchandiser such that each channel is positioned on a peg, thereby holding the light strip in position over the display pegs through magnetic attraction between the display pegs and supports.

* * * * *